United States Patent
Song et al.

(10) Patent No.: US 10,476,095 B2
(45) Date of Patent: Nov. 12, 2019

(54) FUEL CELL AND METHOD OF MANUFACTURING THE SAME

(71) Applicants: Hyundai Motor Company, Seoul (KR); Kia Motors Corporation, Seoul (KR); Korea Advanced Institute of Science and Technology, Daejeon (KR)

(72) Inventors: Youjung Song, Uiwang-si (KR); Won Jung Kim, Seoul (KR); Ki Ung Jeon, Seoul (KR); Yeon Sik Jung, Daejeon (KR)

(73) Assignees: Hyundai Motor Company, Seoul (KR); Kia Motors Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 131 days.

(21) Appl. No.: 15/798,261

(22) Filed: Oct. 30, 2017

(65) Prior Publication Data
US 2019/0013537 A1    Jan. 10, 2019

(30) Foreign Application Priority Data
Jul. 10, 2017    (KR) .................... 10-2017-0087082

(51) Int. Cl.
*H01M 4/86* (2006.01)
*H01M 4/88* (2006.01)
(Continued)

(52) U.S. Cl.
CPC ....... *H01M 8/1018* (2013.01); *H01M 4/8652* (2013.01); *H01M 4/8807* (2013.01);
(Continued)

(58) Field of Classification Search
None
See application file for complete search history.

(56) References Cited

U.S. PATENT DOCUMENTS

2014/0080032 A1\* 3/2014 Soboleva ............ H01M 4/8605
                                                                    429/482
2017/0054189 A1\* 2/2017 Park ...................... H01M 12/08

FOREIGN PATENT DOCUMENTS

KR    10-0670857 B1    1/2007
KR    10-0834008 B1    5/2008
(Continued)

OTHER PUBLICATIONS

Kowalski, D. et al., "Current dependent formation of PEDOT inverse nanotube arrays," RSC Advances, Dec. 14, 2012, 2013, 3, pp. 2154-2157.
(Continued)

*Primary Examiner* — Jonathan Crepeau
(74) *Attorney, Agent, or Firm* — Morgan, Lewis & Bockius LLP

(57) ABSTRACT

A fuel cell may include a fuel supply unit for supplying hydrogen to a fuel cell stack; an air supply unit for supplying air to the fuel cell stack; and the fuel cell stack that generates energy using hydrogen and air supplied from the fuel supply unit and the air supply unit, wherein the fuel cell stack has a mesh structure and comprises a conductive polymer electrode containing about 0.1 to 1 wt % of polyethylene oxide (PEO) having a molecular weight of about 1,000 to 6,000 kg/mol.

13 Claims, 11 Drawing Sheets

(51) Int. Cl.
    *H01M 8/1018*   (2016.01)
    *H01M 8/1007*   (2016.01)
    *H01M 8/0297*   (2016.01)

(52) U.S. Cl.
    CPC ....... *H01M 4/8825* (2013.01); *H01M 4/8835* (2013.01); *H01M 8/0297* (2013.01); *H01M 8/1007* (2016.02); *H01M 2008/1095* (2013.01)

(56)              References Cited

FOREIGN PATENT DOCUMENTS

| KR | 10-0850482 B1    | 8/2008 |
| KR | 10-2012-0093458 A | 8/2012 |
| KR | 10-2013-0057546 A | 6/2013 |

OTHER PUBLICATIONS

Murata, S. et al., "Vertically aligned carbon nanotube electrodes for high current density operating proton exchange membrane fuel cells," Journal of Power Sources, Dec. 10, 2013, vol. 253 (2014), pp. 104-113.

Rodriguez-Moreno, J. et al., "Vertically aligned ZnO@CuS@PEDOT core@shell nanorod arrays decorated with Mn02 nanoparticles for a high-performance and semi-transparent supercapacitor electrode," Chemistry Communication, Apr. 14, 2014, vol. 50, pp. 5652-5655.

* cited by examiner

FUEL CELL AND METHOD OF MANUFACTURING THE SAME

CROSS-REFERENCE TO RELATED APPLICATION(S)

The present application claims priority to Korean Patent Application No. 10-2017-0087082, filed on Jul. 10, 2017, the entire contents of which is incorporated herein for all purposes by this reference.

BACKGROUND

Field of the Invention

The present invention relates to a fuel cell and a method of manufacturing the same.

Description of Related Art

A fuel cell is a device that directly converts the chemical energy of fuel (hydrogen, methanol, coal, natural gas, petroleum, etc.) into electrical energy by an electrochemical reaction in a fuel cell stack. Fuel cell technology has higher power generation efficiency than conventional power generation technology. In addition, fuel cells can simultaneously produce electricity and heat while reducing the emissions of pollutants.

BRIEF SUMMARY

The present invention provides a fuel cell including a conductive polymer electrode having pores aligned in a mesh form, and a method of manufacturing the fuel cell.

Additional aspects of the present invention will be set forth in part in the description which follows and, in part, will be obvious from the description, or may be learned by practice of the disclosure.

In accordance with one aspect of the present invention, provided herein is a fuel cell comprising a fuel supply unit for supplying hydrogen to a fuel cell stack, an air supply unit for supplying air to the fuel cell stack, and the fuel cell stack that generates energy using hydrogen and air supplied from the fuel supply unit and the air supply unit, wherein the fuel cell stack has a mesh structure and includes a conductive polymer electrode containing about 0.1 to 1 wt % of polyethylene oxide (PEO) having a molecular weight of about 1,000 to 6,000 kg/mol.

In various exemplary embodiments, the conductive polymer may include at least one selected from a group consisting of polyaniline, poly(o-methoxyaniline), polypyrrole, poly(3,4-ethylenedioxythiophene), polythiophene, poly(p-phenylene), poly(3-hexylthiophene-2,5-diyl), poly(3-methylthiophene), and poly(p-phenylenevinylene).

In certain embodiments, the conductive polymer electrode may have a period of about 50 nm to about 2 µm, a channel diameter of about 20 nm to about 500 nm, a depth of about 0.2 µm to about 1.6 µm, and an aspect ratio of about 0.5 to about 3.

In accordance with another aspect of the present invention, provided herein is a method of manufacturing a fuel cell comprising the steps of producing a conductive polymer film using a conductive polymer mixture containing about 0.1 wt % to about 1 wt % of polyethylene oxide (PEO) having a molecular weight of about 1,000 kg/mol to about 6,000 kg/mol, and processing the conductive polymer film so that the conductive polymer film has a mesh shape.

Furthermore, the conductive polymer described herein may include at least one selected from a group consisting of polyaniline, poly(o-methoxyaniline), polypyrrole, poly(3,4-ethylenedioxythiophene), polythiophene, poly(p-phenylene), poly(3-hexylthiophene-2,5-diyl), poly(3-methylthiophene), and poly(p-phenylenevinylene).

In certain embodiments, the step of producing the conductive polymer film may include producing a mixture comprising the conductive polymer and the PEO, and spin coating the produced mixture.

In particular embodiments, the step of producing the conductive polymer film may further comprise an acid treatment.

In various exemplary embodiments, the step of spin coating may comprise spin coating the mixture at a speed of about 800 rpm for about 40 seconds.

In various exemplary embodiments, the step of producing the conductive polymer film may further comprise drying and heat-treating to improve the stability of the conductive polymer film to water.

In certain embodiments, the step of processing the conductive polymer film may comprise preparing a mesh-shaped mask on one surface of the conductive polymer film, and etching the conductive polymer film on which the mask is prepared to produce a mesh-shaped electrode.

In various exemplary embodiments, the step of processing the conductive polymer film may further include producing the mesh type mask using a nano-transfer printing process.

In an embodiment, the step of etching the conductive polymer film may include etching the conductive polymer film for about 50 to about 200 seconds with a source power of about 100 W and a bias power of about 70 to 80 W (e.g., about 70 W, about 71 W, about 72 W, about 73 W, about 74 W, about 75 W, about 76 W, about 77 W, about 78 W, about 79 W, or about 80 W).

In various exemplary embodiments, the method of manufacturing a fuel cell may further include mounting the processed conductive polymer electrode on a separation plate.

The methods and fuel cells of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

These and/or other aspects of the disclosure will become apparent and more readily appreciated from the following description of the embodiments, taken in conjunction with the accompanying drawings of which.

Figure 1:
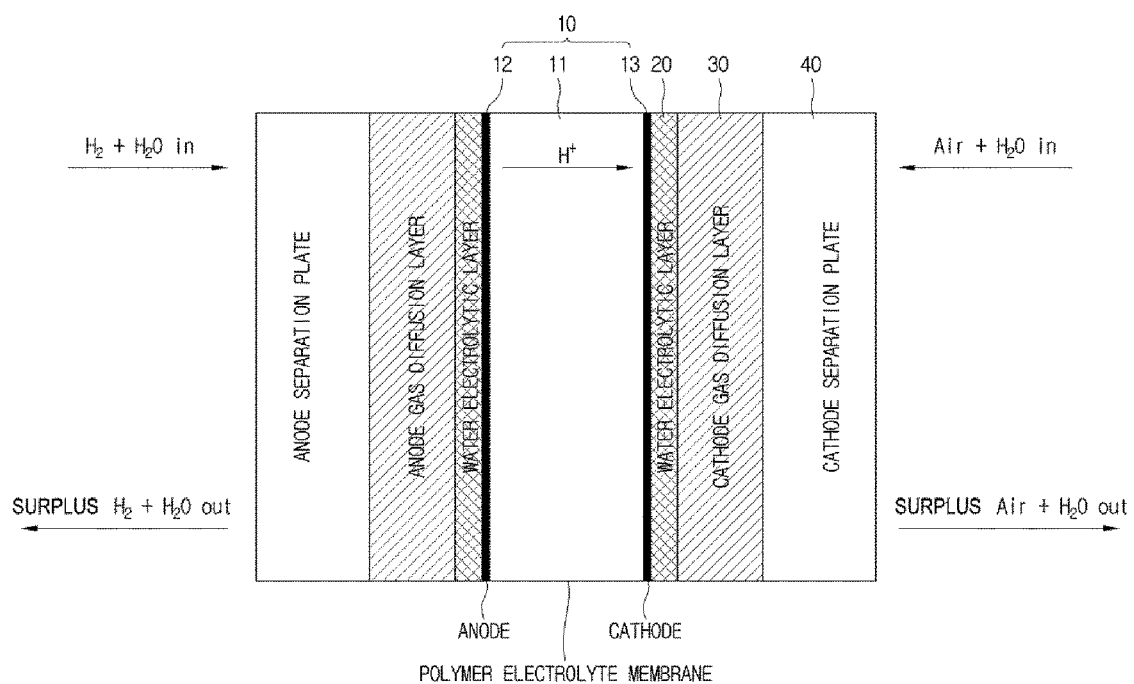
FIG. 1 is a view showing a unit cell structure of a fuel cell stack for explaining an electricity generation principle of a polymer electrolyte membrane fuel cell.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with reference to the accompanying drawings. The following embodiments are provided to fully convey the spirit of the present invention to a person having ordinary skill in the art to which the present invention belongs. The present invention is not limited to the embodiments shown herein but may be embodied in other forms. The drawings are not intended to limit the scope of the present invention in any way, and the size of components may be exaggerated for clarity of illustration.

Hereinafter, a fuel cell and a manufacturing method thereof will be described with reference to the accompanying drawings.

A fuel cell according to an exemplary embodiment of the present invention includes a fuel supply unit, an air supply unit, and a fuel cell stack.

The fuel supply unit supplies hydrogen to the fuel cell stack, and the air supply unit supplies air to the fuel cell stack. The configuration of the fuel supply unit and the air supply unit may include a configuration that can be employed by one of ordinary skill in the art within a range capable of supplying hydrogen ($H_2$) and oxygen ($O_2$) to the fuel cell stack.

The fuel cell stack generates energy using the above-described redox reaction of hydrogen and air (specifically, oxygen contained in air). That is, the fuel cell stack can utilize the current, which is generated by the oxidation reaction of hydrogen and the reduction reaction of oxygen, as energy.

Water may be produced as a by-product in the oxidation of hydrogen and the reduction of oxygen.

Hereinafter, the configuration of the fuel cell stack will be described in more detail.

The fuel cell stack may have a structure in which unit cells including a membrane electrode assembly (MEA), gas diffusion layers (GDL) and bipolar plates are stacked. The unit cells are connected in series to constitute one fuel cell stack.

FIG. 1 is a view showing a unit cell structure of a polymer electrolyte membrane fuel cell (PEMFC) stack.

Referring to FIG. 1, the unit cell of the fuel cell stack according to an exemplary embodiment of the present invention may include a membrane electrode assembly (MEA) 10, water electrolytic layers 20 disposed adjacent to the membrane electrode assembly 10, and gas diffusion layers 30 arranged adjacent to each of the water electrolytic layers 20. More specifically, the unit cell may have a structure in which the water electrolytic layers 20, the gas diffusion layers 30, and separation plates 40 are stacked in order on both left and right sides of the membrane electrode assembly 10 at the center.

The membrane electrode assembly 10 is provided with an anode 12 and a cathode 13 on opposite sides of a polymer electrolyte membrane 11. That is, the structure and performance of the membrane electrode assembly 10, in which two electrodes of the anode 12 and the cathode 13 are produced integrally with the polymer electrolyte membrane 11, plays a central role in a polymer electrolyte fuel cell.

The gas diffusion layer 30 is provided between the separation plate 40 and the electrode to distribute the reactive gas evenly and to transfer electrons generated during the redox reaction.

The separation plate 40 is for moving reaction gases and cooling water, and a flow path may be formed therein. The separation plate 40 also serves as a current collector. Hereinafter, the operation principle of such a fuel cell will be described in more detail.

Referring to FIG. 1, hydrogen is supplied to the anode 12, and oxygen (air) is supplied to the cathode 13.

The supplied hydrogen is decomposed into hydrogen ions (proton, $H^+$) and electrons (electron, $e^-$) with the help of a catalyst in an electrode layer in the anode 12. The hydrogen ions are transferred to the cathode 13 through the polymer electrolyte membrane 11 that is a cation exchange membrane, and at the same time the electrons are transferred to the cathode 13 through the gas diffusion layer 30 and the separation plate 40 that are conductors.

In the cathode 13, hydrogen ions transferred through the polymer electrolyte membrane 11 and electrons transferred through the separation plate 40 meet with oxygen in the air supplied to the cathode 13 to generate water through the catalytic reaction. Electrons formed in the anode 12 flow through an external conducting wire to generate a current.

These various unit cells are connected in series to form one fuel cell stack, and the stack can generate a higher voltage than one unit cell.

Fuel cells are environmentally friendly and have high energy efficiency, but they have problems that make them difficult to commercialize. One of these is corrosion of a commonly used carbon-based carrier.

In order to solve this problem, a variety of alternative carriers have been studied. In addition to being electrochemically stable, these carriers must have high electrical conductivity and a wide surface area for catalytic activity.

Meanwhile, various aspects of the present invention are directed to providing a fuel cell having improved performance by using a conductive polymer carrier having an increased surface area as an electrode of a fuel cell and a method of manufacturing the fuel cell.

A fuel cell and a manufacturing method thereof according to the disclosed embodiment will be described in detail below.

Figure 2:
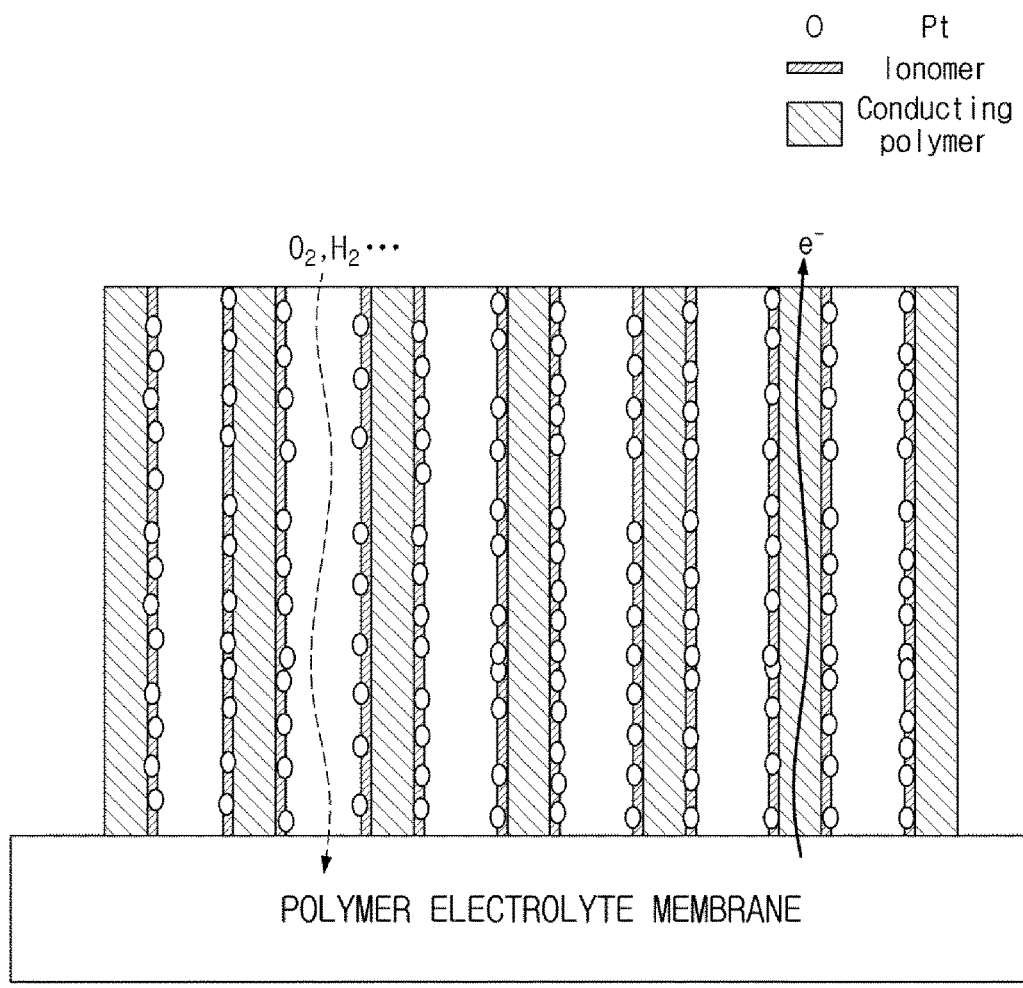
FIG. 2 is a structural schematic diagram of a conductive polymer electrode material according to an exemplary embodiment of the present invention.
Figure 3:
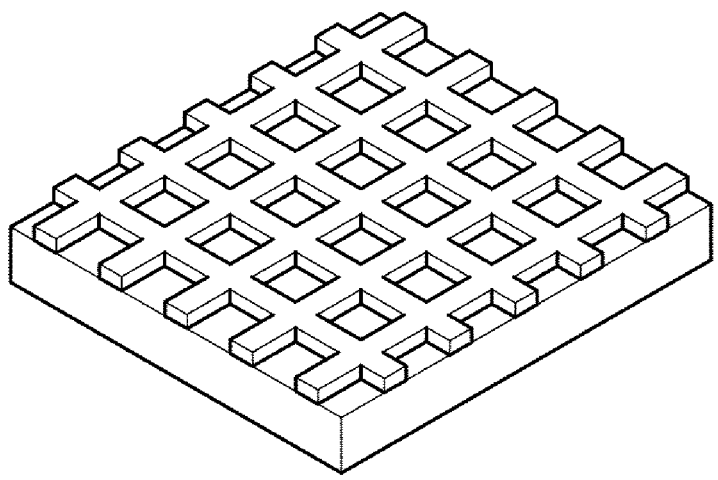
FIG. 3 is a view illustrating an etching process of a conductive polymer electrode material and a conductive polymer electrode manufactured in a mesh shape according to an exemplary embodiment of the present invention.
Figure 3:
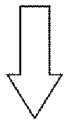
Figure 3:
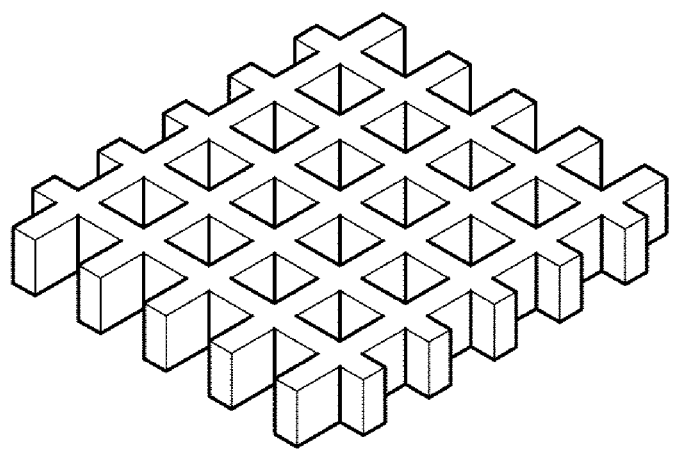

FIG. 2 is a conceptual view of a cross-section of a conductive polymer electrode according to an exemplary embodiment of the present invention. FIG. 3 is a perspective view of a conductive polymer electrode according to an exemplary embodiment of the present invention.

As illustrated in FIG. 3, the electrode has a mesh structure in which the pores are vertically aligned to maximize the movement efficiency of the materials (hydrogen, oxygen) required for the reaction and to effectively discharge the generated water during the electrochemical reaction, thereby being usefully used as a carrier constituting a fuel cell or a battery anode material.

The electrode is produced with a mesh structure having vertically aligned pores so that the movement efficiency of the materials (hydrogen, oxygen) required for the reaction is maximize and the generated water during the electrochemical reaction is effectively discharged. Therefore, the electrode can be usefully used as a carrier constituting a fuel cell or a battery anode (positive) material.

In addition, since the conductive polymer has a high conductivity (several tens of S/cm) of more than a carbon-based carrier (2 to 5 S/cm), it is easy to transfer electrons and thus contributes to the improvement of the performance of the fuel cell. In particular, the conductive polymer is electrochemically very stable under the PEMFC operating conditions, and thus the durability can be greatly improved by effectively inhibiting the corrosion occurring in the conventional carbon-based fuel cell carrier.

As the conductive polymer, PEDOT:PSS (poly(3,4-ethylenedioxythiophene):poly(styrene sulfonate)) (hereinafter, abbreviated as "PEDOT:PSS") may be used.

PEDOT:PSS is attracting much attention as a printable electrode material. Specifically, PEDOT:PSS produced from pure $H_2O$ is thermally stable, and can be easily spin-coated, thus being excellent in processability, and thus is a commercialized conductive polymer.

However, examples of the conductive polymer are not limited thereto, and at least one selected from a group consisting of polyaniline, poly(o-methoxyaniline), polypyrrole, poly(3,4-ethylenedioxythiophene), polythiophene, poly(p-phenylene), poly(3-hexylthiophene-2,5-diyl), poly (3-methylthiophene), and poly(p-phenylenevinylene) may be used as the conductive polymer.

Furthermore, in order to impart stability to water to the conductive polymer electrode, PEO (polyethylene oxide) which cross-reacts with the conductive polymer may be added.

On the other hand, if the molecular weight of the PEO to be used is low or the content is insufficient, stability in water cannot be secured and the structure is easily collapsed.

In addition, if the content of the PEO is excessive, the PEO cannot be sufficiently dissolved due to the solubility limit, and thus a uniform film, described later, cannot be produced.

In various exemplary embodiments, the conductive polymer may include about 0.1 wt % to about 1 wt % (e.g., about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, or about 1 wt %) of the PEO having a molecular weight of about 1000 kg/mol to about 6000 kg/mol (e.g., about 1000 kg/mol, about 2000 kg/mol, about 3000 kg/mol, about 4000 kg/mol, about 5000 kg/mol, or about 6000 kg/mol).

Furthermore, a structure produced with the conductive polymer electrode material may be provided to have a period of about 50 nm to about 2 µm (e.g., about 50 nm, about 100 nm, about 200 nm, about 300 nm, about 400 nm, about 500 nm about 600 nm, about 700 nm, about 800 nm, about 900 nm, about 1 µm, about 1.1 µm, about 1.2 µm, about 1.3 µm, about 1.4 µm, about 1.5 µm, about 1.6 µm, about 1.7 µm, about 1.8 µm, about 1.9 µm, and about 2.0 µm), a channel diameter of about 20 nm to about 500 nm (e.g., about 20 nm, about 40 nm, about 60 nm, about 80 nm, about 100 nm, about 150 nm, about 200 nm, about 250 nm, about 300 nm, about 350 nm, about 400 nm, about 450 nm, or about 500 nm), and a depth of about 0.2 µm to about 1.6 µm (e.g., about 0.2 µm, about 0.3 µm, about 0.4 µm, about 0.5 µm, about 0.6 µm, about 0.7 µm, about 0.8 µm, about 0.9 µm, about 1.0 µm, about 1.1 µm, about 1.2 µm, about 1.3 µm, about 1.4 µm, about 1.5 µm, or about 1.6 µm). However, the period, the channel diameter and the depth of the structure are not limited to the above-mentioned range.

In various exemplary embodiments, the pores of the carrier produced with the conductive polymer electrode material may have an aspect ratio of about 0.5 to 3, but the present invention is not limited thereto. A detailed description related thereto will be described later.

Figure 4:
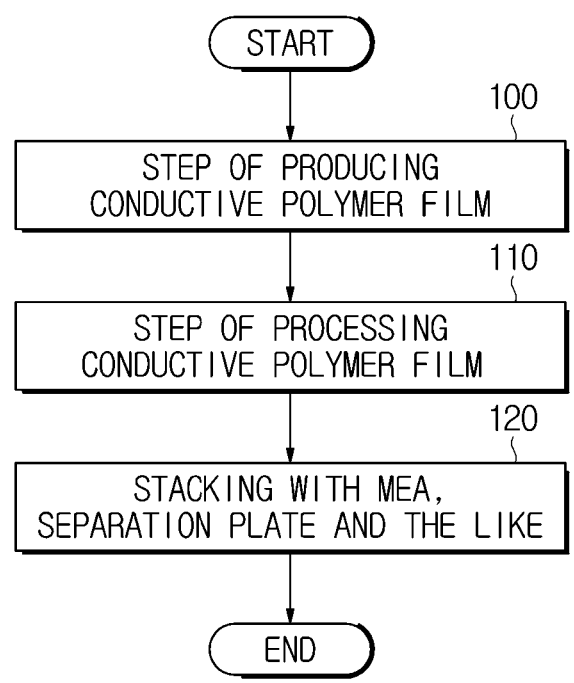
FIG. 4 is a flowchart illustrating a process of manufacturing a fuel cell according to an exemplary embodiment of the present invention.

FIG. 4 is a flowchart for a method of manufacturing a fuel cell according to an embodiment.

Referring to FIG. 4, a method of manufacturing a fuel cell according to the disclosed embodiment includes the steps of producing a conductive polymer film (Step 100), processing the conductive polymer film (Step 110), and forming a unit cell by being stacked with a polymer electrolyte membrane-electrode assembly (MEA), a separation plate, or the like (Step 120).

In the step of producing the conductive polymer film, about 0.1 wt % to about 1 wt % of PEO having a molecular weight of about 1000 kg/mol to about 6000 kg/mol is added to the conductive polymer and mixed until completely dissolved. The blend solution, in which the PEO is sufficiently dissolved, is evenly spread on a silicon substrate and then spin-coated to form a uniform film.

Such a conductive polymer may undergo an acid treatment process using an inorganic acid such as sulfuric acid, hydrochloric acid and nitric acid in order to improve the electrical conductivity.

Thereafter, a step of drying and heat-treating the conductive polymer film may further be included so as to improve the stability of the conductive polymer film to water.

In the step of processing the conductive polymer film according to an exemplary embodiment of the present invention, a desired metal is deposited on a mask template to obtain nanowires, and then the nanowires are printed on the conductive polymer film through a mold by a nano-transfer printing process to produce an etching mask of a mesh pattern, and by forming a nanostructure in which pores are vertically aligned through etching of a conductive polymer film using a plasma, an electrode material capable of improving the movement speed of materials (hydrogen, oxygen) necessary for reaction is manufactured.

$O_2$, Ar, $N_2$, He, $CF_4$, $CHF_3$, $C_2F_6$, HF or $SiF_4$ may be used for plasma etching. In addition, the etching can be performed by using any one of methods of forming a surface structure such as dry etching or wet etching, or by mixing two or more methods.

In the plasma etching process of the present invention, the size and shape of the high aspect ratio nano structure can be controlled by regulating the bias power and the etching time (plasma irradiation time). In this case, the power of the source is about 100 W, the power of the bias is about 80 W, and the etching time is about 120 seconds as a standard. Under standard conditions, the etching depth of the structure is about 1 μm.

When the power of bias is weak compared with the source, the structure is made symmetrical, and the wall of the structure is etched and collapsed. Specifically, such excessive etching occurs when the source power and bias power fall below 70 W under reference conditions.

In addition, since the formation of a surface nanostructure according to the plasma etching time may greatly affect the performance of a fuel cell, it is important to set an appropriate time and irradiate the plasma, and it is preferable to perform the plasma etching by setting the time within about 50 seconds to about 200 seconds (e.g., about 50 seconds, about 75 seconds, about 100 seconds, about 150 seconds, about 175 seconds, or about 200 seconds).

If the etching time is less than 50 seconds, the etching effect is too low to clearly develop a nanostructure. If the etching time exceeds 200 seconds, it is difficult to control the desired nanostructured surface shape due to excessive etching, and there is a problem in that the surface treatment cycle time is too long resulting in productivity being lowered.

Figure 11:
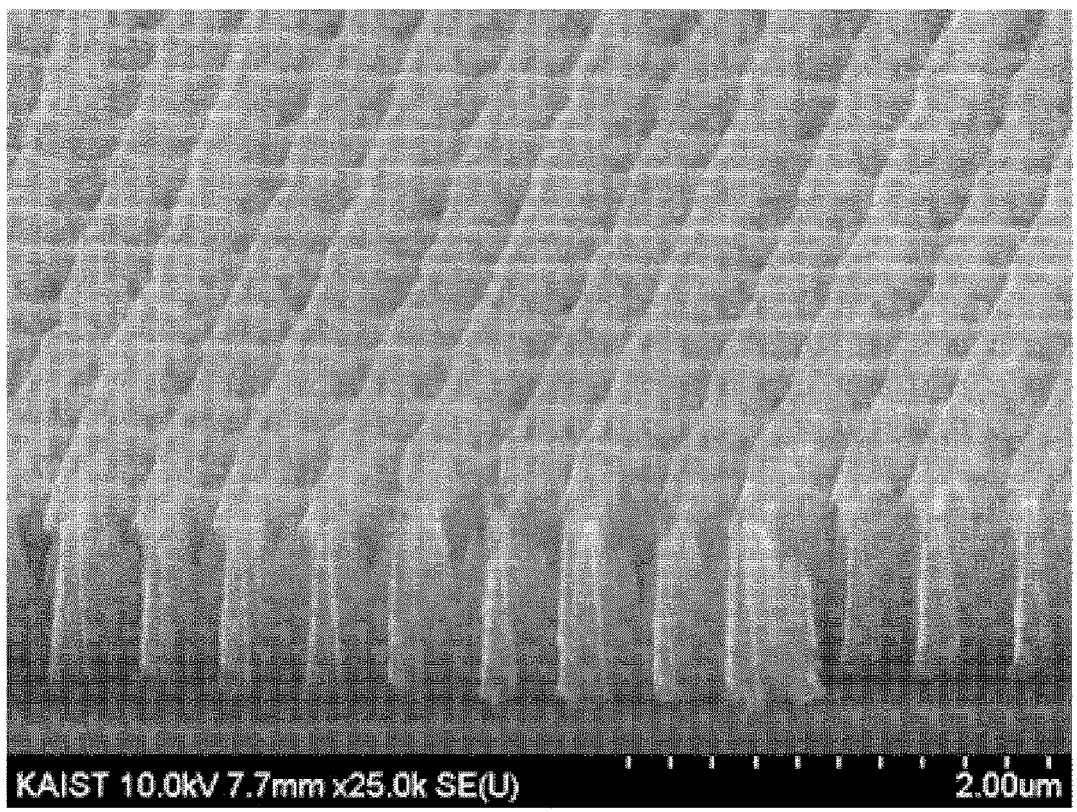
FIG. 11 is a view showing that the wall surface structure of the electrode material due to excessive etching is broken.

FIG. 11 shows that a wall structure of the electrode material is collapsed due to excessive etching.

Such a manufacturing method is capable of semi-permanent reuse of a mask template and facilitates mass production in a large area through plasma etching, thereby improving process efficiency.

The electrode material produced as described above is stacked with a polymer electrolyte membrane-electrode assembly (MEA), a separation plate and the like to form a unit cell. When such cells are repeatedly stacked, a polymer electrolyte membrane fuel cell can be manufactured.

Hereinafter, embodiments of the present invention will be described in more detail. The following embodiments are for illustrating the disclosure, and the technical idea of the disclosure is not limited by these embodiments.

EXAMPLES

The following examples ill e invention and are not intended to limit the same.

Embodiment 1

Step of Producing a Conductive Polymer Film 0.03 g of PEO (molecular weight: 4,000 kg/mol) per 10 g of PEDOT:PSS solution (1.2 wt %) is added and mixed until fully dissolved. A blend solution in which the PEO is sufficiently dissolved is evenly dispersed on a silicon substrate, and spin-coated at a speed of 800 rpm for 40 seconds to produce a uniform film. Then, the film is dried on a hot plate at 80° C.

Figure 5:
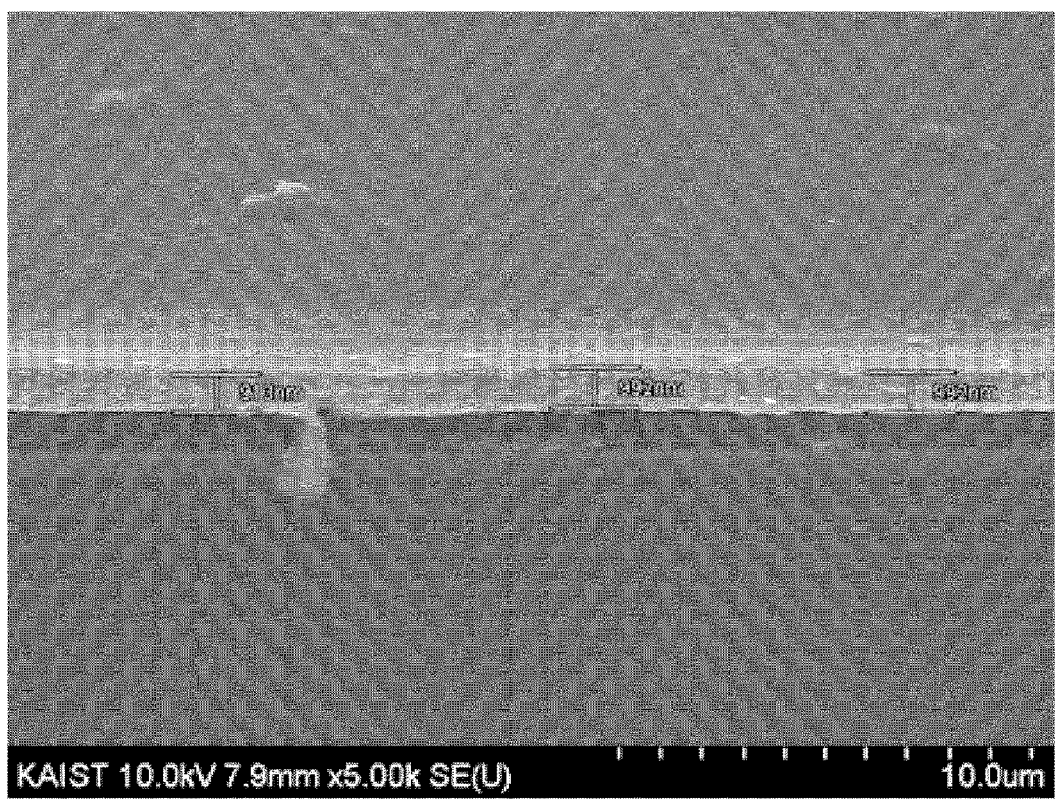
FIG. 5 is a view showing a uniform conductive polymer film produced according to an exemplary embodiment of the present invention.
Figure 6:
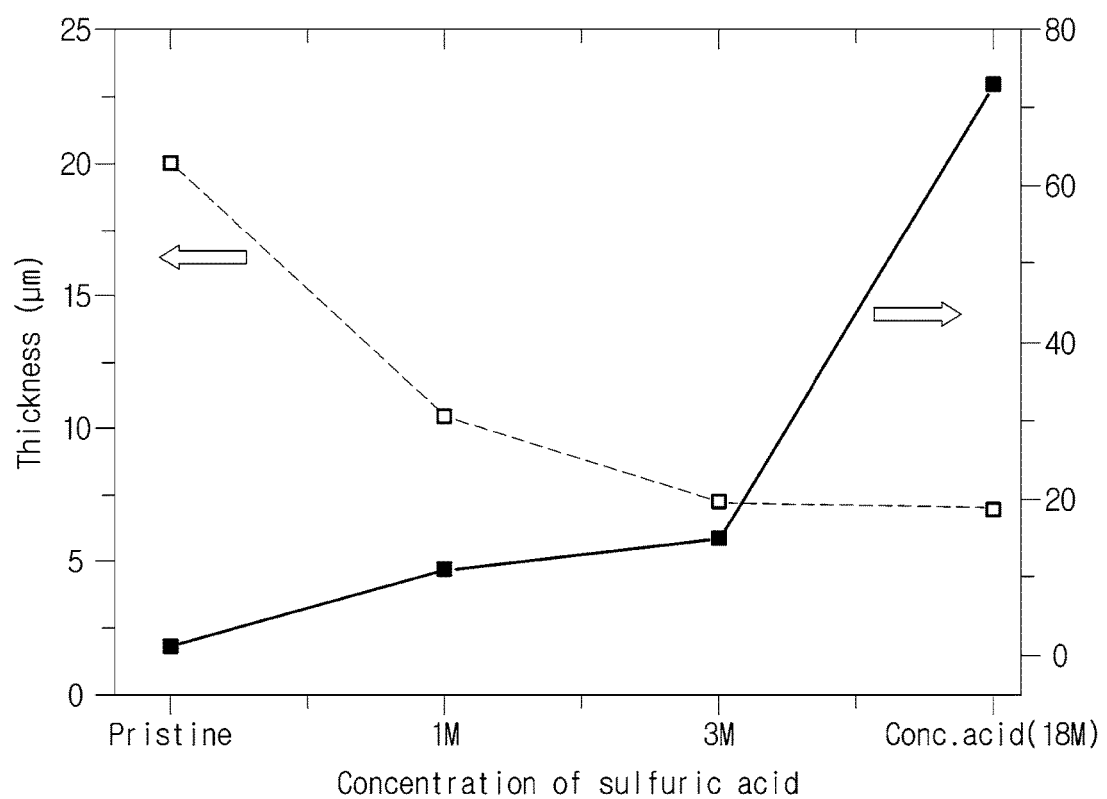
FIG. 6 is a view for explaining an electric conductivity improving effect in a sulfuric acid treatment of a PEDOT:PSS solution according to an exemplary embodiment of the present invention.

The thickness of the produced film is 1 μm, which is shown in FIG. 5.

Next, the produced film is heat-treated in a 150° C. vacuum oven for 6 hours in order to increase the stability of PEDOT:PSS and PEO composite film to water through a crosslinking reaction between PEO and PSS.

Step of Processing a Conductive Polymer Film

A mask template is slanted to 72° and Cr is deposited to a thickness of 3 nm using an E-beam deposition method to obtain nanowires.

The nanowires are transferred onto the previously produced conductive polymer film using a nano-transfer printing process. Next, the conductive polymer film on which the nanowires are transferred is rotated by 90°, and a etch mask of a mesh shape is produced by repeating the nano-transfer printing process.

At this time, the period and width of the nanowire can be varied according to a desired structure by regulating the period, width, deposition thickness, and the like of the mask template used in the metal deposition.

Next, a conductive polymer on which the mesh-shaped etch mask is placed is etched 1 μm for 120 seconds using a power of 100 W and a bias of 80 W under an $O_2$ plasma atmosphere thereby producing a conductive polymer-based electrode material having pores vertically aligned as shown in FIG. 3.

Comparative Example 1

Unlike the molecular weight of the PEO added in the above-mentioned [Embodiment 1], 400 kg/mol and 100 kg/mol of PEO are added, respectively, and the other conditions are the same as in [Embodiment 1], and descriptions overlapping with [Embodiment 1] will be omitted.

FIGS. 7 to 10 show changes in the structure after immersing the electrodes in water in order to test the stability of the conductive polymer electrodes in which the pores are vertically aligned according to the embodiments of the present invention and the comparative example, in water.

Figure 7:
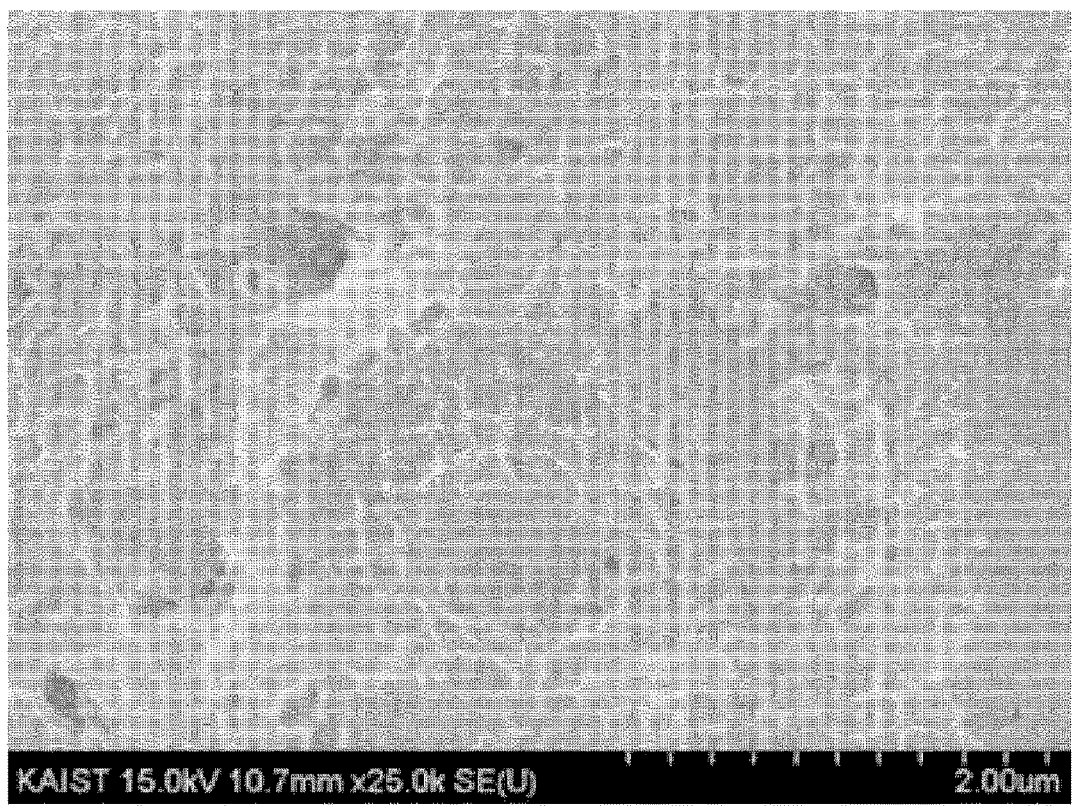
FIG. 7, FIG. 8, FIG. 9, and FIG. 10 are views showing the relationship between the molecular weight and the content of PEO added to the PEDOT:PSS solution and the stability to water according to an exemplary embodiment of the present invention.
Figure 8:
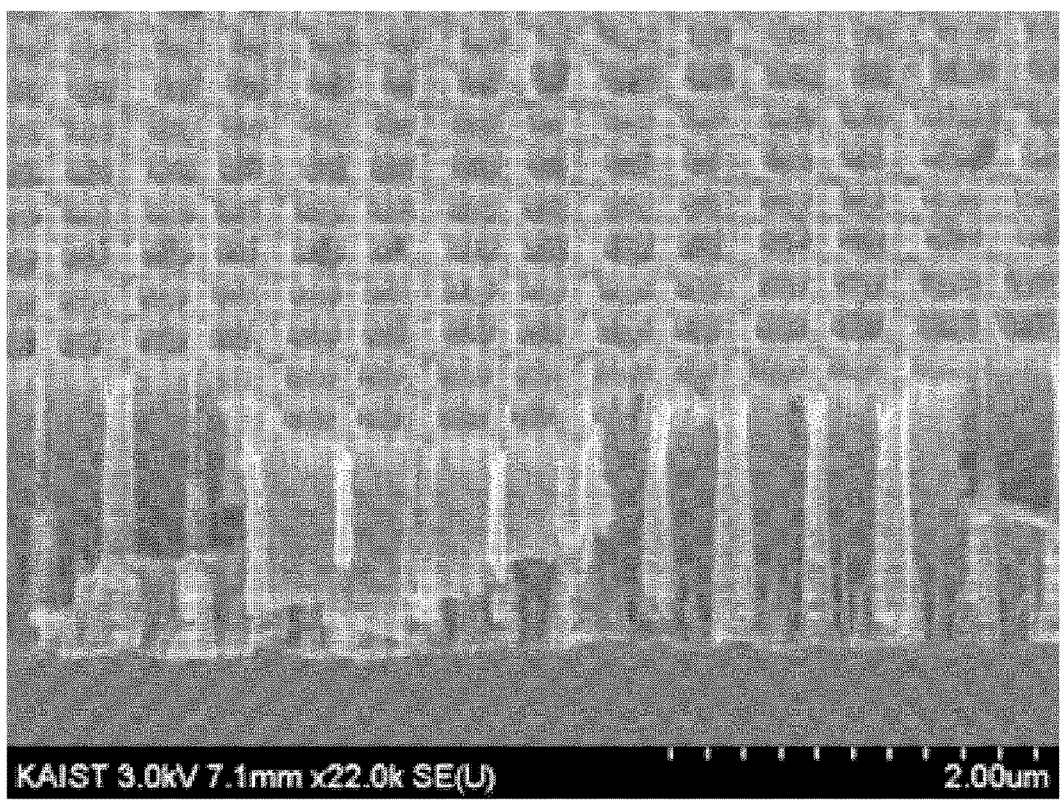

FIG. 7 shows a state after an electrode material prepared without adding PEO to a PEDOT:PSS solution is immersed in water for 1 hour, and FIG. 8 shows a state after an electrode material prepared by adding 0.3 wt % of PEO having a Mw of 4,000 kg/mol to a PEDOT:PSS solution is immersed in water for 24 hours.

Figure 9:
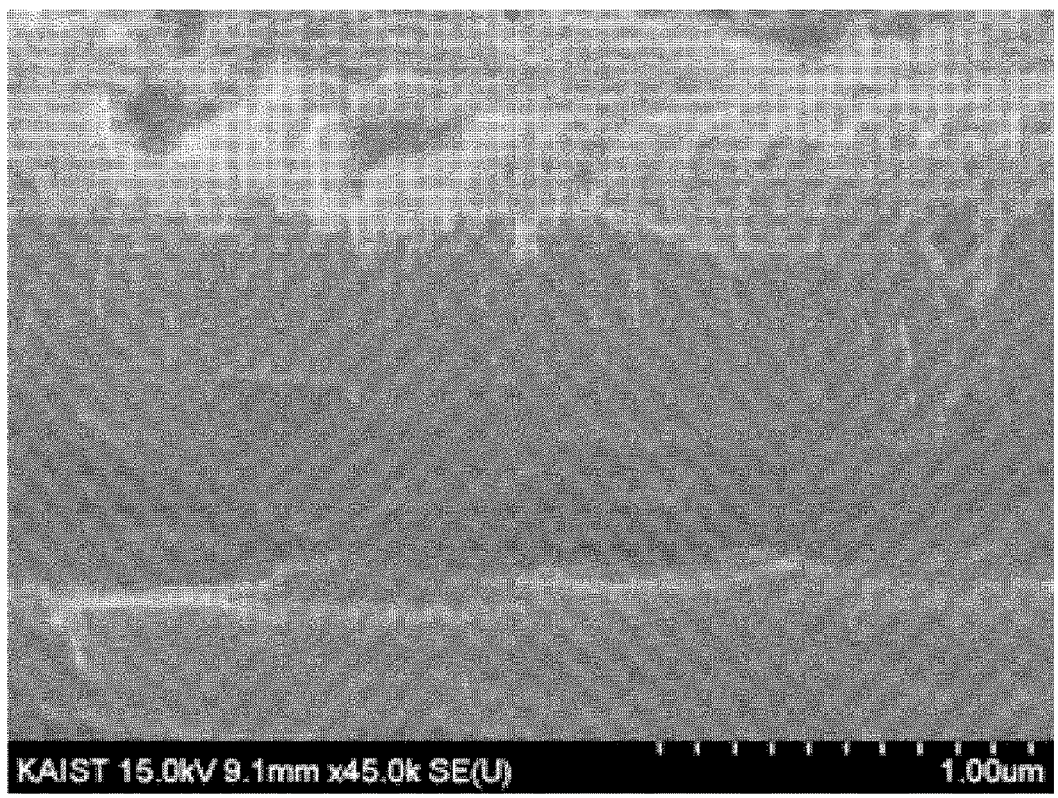
Figure 10:
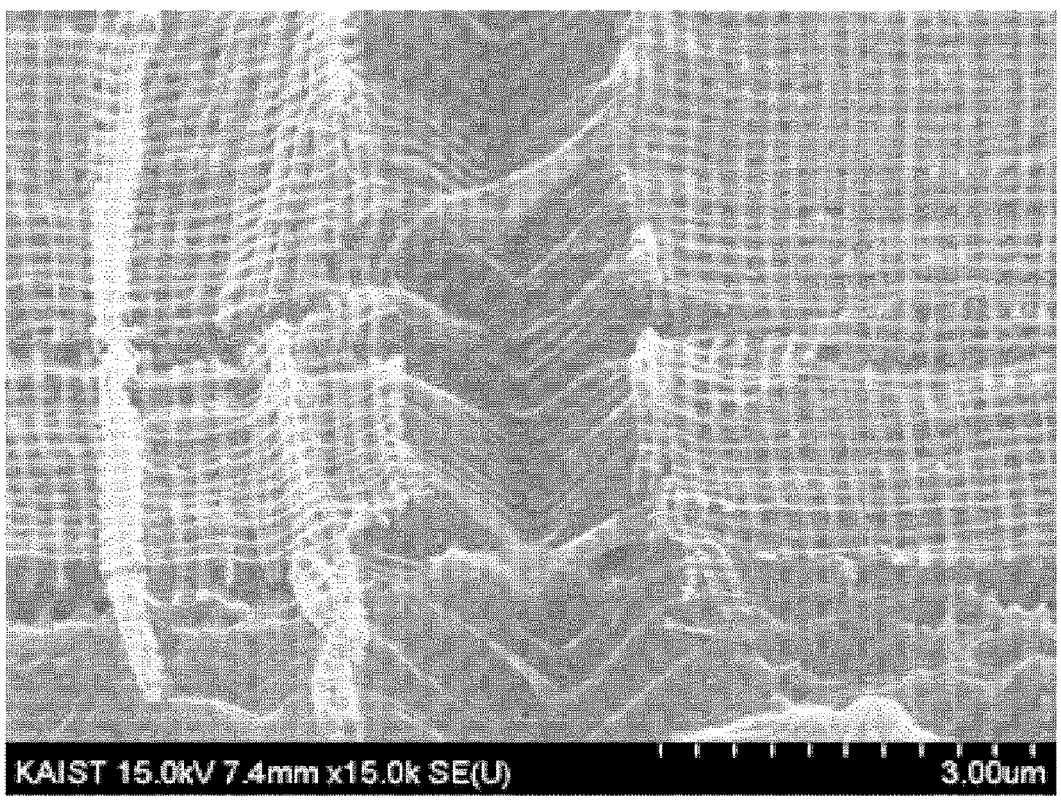

FIG. 9 shows a state after an electrode material prepared by adding 0.3 wt % of PEO having a Mw of 400 kg/mol to a PEDOT:PSS solution is immersed in water for 6 hours, and FIG. 10 shows a state after an electrode material prepared by adding 0.3 wt % of PEO having a Mw of 100 kg/mol to a PEDOT:PSS solution is immersed in water for 6 hours.

Referring to FIG. 8, when the molecular weight of PEO is 4,000 kg/mol or more, sufficient effect is exerted. If the molecular weight of the added PEO is lower than 4,000 kg/mol, or the content is less than 0.3 wt %, as can be seen in FIGS. 7, 9 and 10, the structure is easily collapsed because it cannot secure stability in water.

As is apparent from the above, the disclosed embodiment can provide a fuel cell including electrodes of a mesh structure to increase the moving speed of materials ($H_2$, $O_2$) required for a reaction occurring in the fuel cell.

In addition, the conductive polymer can reduce the corrosion of the catalyst carrier generated in the start-stop process of the fuel cell.

For convenience in explanation and accurate definition in the appended claims, the terms "upper", "lower", "up", "down", "upwards", "downwards", "inner", "outer", "inside", "outside", "inwardly", "outwardly", "interior", "exterior", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A fuel cell stack comprising:
    a fuel supply unit for supplying hydrogen to the fuel cell stack;
    an air supply unit for supplying air to the fuel cell stack; and
    the fuel cell stack that generating energy using hydrogen and air supplied from the fuel supply unit and the air supply unit,
wherein at least one of the electrodes has a mesh structure and comprises a conductive polymer containing about 0.1 to 1 wt % of polyethylene oxide (PEO) having a molecular weight of about 1,000 to 6,000 kg/mol.

2. The fuel cell according to claim 1,
    wherein the conductive polymer comprises at least one selected from a group consisting of polyaniline, poly (o-methoxyaniline), polypyrrole, poly(3,4-ethylenedioxythiophene), polythiophene, polyp-phenylene), poly (3-hexylthiophene-2,5-diyl), poly(3-methylthiophene), and poly(p-phenylenevinylene).

3. The fuel cell according to claim 1,
    wherein at least one of the electrodes of the conductive polymer has a period of about 50 nm to 2 µm, a channel diameter of about 20 to 500 nm, a depth of about 0.2 to 1.6 µm, and an aspect ratio of about 0.5 to 3.

4. A method of manufacturing a fuel cell electrode, the method comprising the steps of:
    producing a conductive polymer film using a conductive polymer containing about 0.1 to 1 wt % of polyethylene oxide (PEO) having a molecular weight of about 1,000 to 6,000 kg/mol; and
    processing the conductive polymer film so that the conductive polymer film has a mesh shape.

5. The method according to claim 4,
    wherein the conductive polymer comprises at least one selected from a group consisting of polyaniline, poly (o-methoxyaniline), polypyrrole, poly(3,4-ethylenedioxythiophene), polythiophene, polyp-phenylene), poly (3-hexylthiophene-2,5-diyl), poly(3-methylthiophene), and poly(p-phenylenevinylene).

6. The method according to claim 4,
    wherein the step of producing the conductive polymer film comprises:
    producing a mixture comprising the conductive polymer and the PEO; and
    spin coating the produced mixture.

7. The method according to claim 6, further comprising an acid treatment.

8. The method according to claim 6,
    wherein the step of spin coating comprises spin coating the mixture at a speed of about 800 rpm for about 40 seconds.

9. The method according to claim 6,
    wherein the step of producing the conductive polymer film further comprises drying and heat-treating to improve the stability of the conductive polymer film to water.

10. The method according to claim 4,
    wherein the step of processing the conductive polymer film comprises:
    preparing a mesh-shaped mask on one surface of the conductive polymer film; and
    etching the conductive polymer film on which the mask is prepared to produce a mesh-shaped electrode.

11. The method according to claim 10,
    wherein the step of processing the conductive polymer film further comprises producing the mesh type mask using a nano-transfer printing process.

12. The method according to claim 10,
    wherein the step of etching the conductive polymer film comprises etching the conductive polymer film for about 50 to 200 seconds with a source power of about 100 W and a bias power of about 70 to 80 W.

13. The method according to claim 4, further comprising mounting the processed conductive polymer electrode on a separation plate.

* * * * *